US009677508B2

(12) United States Patent
Conti et al.

(10) Patent No.: US 9,677,508 B2
(45) Date of Patent: Jun. 13, 2017

(54) FUEL OPTIMIZATION SYSTEM

(71) Applicant: KCS678 LLC, Medford, OR (US)

(72) Inventors: Louis George Conti, Waterford, MI (US); Calvin Robert Visser, Rochester, MI (US)

(73) Assignee: KCS678 LLC, Medford, OR (US)

( * ) Notice: Subject to any disclaimer, the term of this patent is extended or adjusted under 35 U.S.C. 154(b) by 0 days.

(21) Appl. No.: 14/886,916

(22) Filed: Oct. 19, 2015

(65) Prior Publication Data

US 2016/0115908 A1    Apr. 28, 2016

Related U.S. Application Data

(60) Provisional application No. 62/068,303, filed on Oct. 24, 2014.

(51) Int. Cl.
*F02M 25/022*      (2006.01)
*C10L 1/32*        (2006.01)
(Continued)

(52) U.S. Cl.
CPC ......... *F02M 25/0227* (2013.01); *C10L 1/328* (2013.01); *F01P 1/06* (2013.01); *F01P 3/12* (2013.01); *F02M 25/0228* (2013.01); *F02M 37/0052* (2013.01); *F02M 37/0076* (2013.01); *F02M 37/0082* (2013.01); *C10L 2200/0295* (2013.01); *C10L 2230/22* (2013.01); *C10L 2250/084* (2013.01); *C10L 2270/026* (2013.01); *C10L 2290/146* (2013.01); *C10L 2290/24* (2013.01); *C10L 2290/562* (2013.01);
(Continued)

(58) Field of Classification Search
USPC .......................................................... 44/639
See application file for complete search history.

(56) References Cited

U.S. PATENT DOCUMENTS 4,388,893 A * 6/1983 Apfel ................. F02M 25/0227
                                                      123/198 A
5,125,367 A    6/1992 Ulrich et al.
(Continued)

FOREIGN PATENT DOCUMENTS

WO    WO2014044381    *  3/2014

*Primary Examiner* — Ellen McAvoy
*Assistant Examiner* — Chantel Graham
(74) *Attorney, Agent, or Firm* — Honigman Miller Schwartz and Cohn LLP (57) ABSTRACT

A system includes an emulsification device, a processed fuel tank, an emulsification recirculation line, and a control module. The emulsification device is configured to selectively receive a liquid mixture of water and hydrocarbon fuel and produce batches of emulsified fuel. The processed fuel tank is configured to selectively receive and store the emulsified fuel. The control module is configured to monitor one or more operating parameters and execute one or more operating modes. The operating modes include a bypass mode configured to provide the engine with the hydrocarbon fuel, an emulsification recirculation mode configured to continually recirculate emulsified fuel through the emulsification device and the processed fuel tank via the emulsification recirculation line, a run mode configured to operate the engine with emulsified fuel, and a suck back mode configured to return semi-stable emulsified fuel back to the processed fuel tank.

20 Claims, 6 Drawing Sheets

(51) Int. Cl.
F02M 37/00 (2006.01)
F01P 3/12 (2006.01)
F01P 1/06 (2006.01)

(52) U.S. Cl.
CPC ..... *C10L 2290/567* (2013.01); *C10L 2290/58* (2013.01); *C10L 2290/60* (2013.01)

(56) References Cited

U.S. PATENT DOCUMENTS

| | | |
|---|---|---|
| 5,245,953 A | 9/1993 | Shimada et al. |
| 5,542,379 A | 8/1996 | Kessler |
| 5,682,842 A | 11/1997 | Coleman et al. |
| 6,368,366 B1 | 4/2002 | Langer et al. |
| 7,041,145 B2 | 5/2006 | Ambrosini et al. |
| 7,930,998 B2 | 4/2011 | Cottell |
| 7,934,474 B2 | 5/2011 | Cottell |
| 2006/0161315 A1* | 7/2006 | Lewis ................ G08G 1/20 701/1 |
| 2013/0036662 A1 | 2/2013 | Cottell |
| 2013/0276736 A1 | 10/2013 | Cottell |
| 2014/0041288 A1 | 2/2014 | Markert et al. |

* cited by examiner

5 MINUTES

This is an estimated time remaining until 3 gallons of fuel is either burned or returned from the engine. Please wait until this process completes before shutting down the vehicle.

*FIG. 6A*

You are slowing down the vehicle. Are you expecting to shutdown the vehicle soon or are you going to be driving in the city?

*FIG. 6B*

FUEL OPTIMIZATION SYSTEM

CROSS REFERENCE TO RELATED APPLICATIONS

This U.S. patent application claims priority under 35 U.S.C. §119(e) to U.S. Provisional Application 62/068,303, filed on Oct. 24, 2014.

TECHNICAL FIELD

This disclosure relates to emulsions of water in hydrocarbon fuel to increase fuel efficiency and decrease emissions. More specifically, this disclosure relates to producing emulsions of water in hydrocarbon fuel on board a vehicle during optimal periods based on engine operating conditions.

BACKGROUND

Fuel water emulsion is a mixture of hydrocarbon fuel, such as diesel fuel, and microscopically small bubbles of water are encapsulated in diesel fuel. Often, a small amount of chemical additive is required to hold the water bubbles in suspension, causing the fuel water emulsion to appear milky in color. When fuel water emulsion settles, the fuel water emulsion may become semi-stable and eventually unstable where the water separates from the fuel. Free water that has separated is harmful when it resides and sits within an engine and/or fuel system causing corrosion.

Generally, fuel water emulsion is mixed in large batches and utilized as a direct replacement fuel. The fuel water emulsion may have to sit in storage containers/tanks for extended periods before it is fed to a fuel system for an engine. To maintain stability of the fuel water emulsion, these large mixed batches require a high percentage of chemical additives. Stability may be required for as long as four months. While this approach is accepted in specific fleets, over-the-road trucks suffer many drawbacks using the pre-mixed fuel water emulsion as the replacement fuel. Namely, cold engine starting is difficult to achieve, and is further implicated with time and lower ambient temperatures. Additionally, unlike a generator that operates continuously without being shut-down, trucks shut-down for extended periods of time resulting in corrosion when free water separates from the fuel. Moreover, high ratios of chemical additives (e.g., 2-3%) required for maintaining stability of the fuel water emulsion, lead to combustion inefficiencies that result in reduced fuel efficiencies and loss of power/drivability.

SUMMARY

One aspect of the disclosure provides a fuel emulsion system including an emulsification device, a processed fuel tank, an emulsification recirculation line, and a control module. The emulsification device is configured to selectively receive a liquid mixture of water and hydrocarbon fuel and produce batches of emulsified fuel including water-micro droplets emulsified in the hydrocarbon fuel. The processed fuel tank is in fluid communication with the emulsification device and an engine, and is configured to selectively receive and store the emulsified fuel produced by the emulsification device. The emulsification recirculation line is configured to selectively provide fluid communication between the emulsification device and the processed fuel tank. The control module is configured to monitor one or more operating parameters and execute one or more operating modes of the fuel emulsion system based on the monitored operating parameters. The operating modes include a bypass mode configured to provide the engine with the hydrocarbon fuel while restricting the emulsification device and the processed fuel tank from receiving the hydrocarbon fuel, an emulsification recirculation mode configured to continually recirculate emulsified fuel through the emulsification device and the processed fuel tank via the emulsification recirculation line, an emulsified fuel run mode configured to operate the engine with emulsified fuel produced by the emulsification device and stored within the processed fuel tank, and a suck back mode configured to return semi-stable emulsified fuel within at least one of a fuel supply line or a fuel suck back line back to the processed fuel tank.

Implementations of the disclosure may include one or more of the following optional features. In some implementations, the control module executes the bypass mode during at least one of engine start-ups or engine shut-downs. The control module may execute the bypass mode and the emulsification production mode simultaneously. In some examples, the emulsification production mode is configured to provide a portion of the hydrocarbon fuel to the processed fuel tank before providing the emulsification device with the hydrocarbon fuel and the water to produce the emulsified fuel. In these examples, the emulsification production mode may be further configured to provide the emulsification device with one or more additives from one or more additive tanks.

In some configurations, the system also includes a fuel level sensor in communication with the control module and configured to measure an amount of emulsified fuel within the processed fuel tank and the control module executes the emulsification production mode in response to the fuel level sensor indicating that the measured amount of emulsified fuel within the processed fuel tank is below a predetermined fuel level. The control module may execute the emulsification production mode and the emulsification run mode simultaneously. In some implementations, the system also includes a water-in-fuel sensor in communication with the control module and configured to measure a water-in-fuel separation ratio of the emulsified fuel stored within the processed fuel tank, and the control module executes the emulsification recirculation mode in response to the water-in-fuel sensor indicating that the measured water-in-fuel separation ratio reaches a predetermined separation level.

In some implementations, the control module executes the emulsified fuel run mode when at least one of an engine load or engine speed is within a predetermined range suitable for fueling the engine with the emulsified fuel. In some scenarios, the control module executes the suck back mode during periodic intervals. In some examples, the system also includes a plurality of flow control devices in communication with the control module and operative between open and closed positions to control fluid flow based upon the one or more operating modes currently executing. The system may also include a radiator/fan module in fluid communication with the processed fuel tank and configured to cool the emulsified fuel stored within the processed fuel tank by circulating the emulsified fuel therethrough. In some implementations, the system includes an operator interface device in communication with the control module. The operator interface device may execute a graphical user interface configured to display graphics indicating current operating conditions of the fuel emulsion system.

Another aspect of the disclosure provides a fuel emulsion system for fueling an engine of a vehicle. The system includes an emulsification device, a processed fuel tank, an operator interface device, and a control module. The emulsification device is configured to selectively receive a liquid mixture of water and hydrocarbon fuel and produce batches of emulsified fuel including water-micro droplets emulsified in the hydrocarbon fuel. The processed fuel tank is in fluid communication with the emulsification device and the engine, and is configured to selectively receive and store the emulsified fuel produced by the emulsification device. The operator interface device executes a graphical user interface configured to display graphics indicating current operating conditions of the fuel emulsion system. The control module is in communication with the operator interface device and is configured to monitor one or more operating parameters and execute one or more operating modes of the fuel emulsion system based on the monitored operating parameters. The operating modes include a bypass mode configured to provide the engine with the hydrocarbon fuel while restricting the emulsification device and the processed fuel tank from receiving the hydrocarbon fuel, an emulsification production mode configured to provide the emulsification device with the hydrocarbon fuel and the water to produce the emulsified fuel, an emulsified fuel run mode configured to operate the engine with emulsified fuel produced by the emulsification device and stored within the processed fuel tank, and a shut-down mode configured to at least one of burn off or reclaim semi-stable emulsified fuel within the fuel emulsion system.

This aspect may include one or more of the following optional features. In some implementations, the control module prompts the operator interface device to display an inquiry graphic upon the graphical user interface in response to a speed of the vehicle decreasing below a predetermined vehicle speed. The inquiry graphic requests an input from the operator that indicates whether the operator intends to shut-down the vehicle or whether the operator intends to drive the vehicle in a city. In these implementations, the control module executes the shut-down mode when the input from the operator indicates that the operator intends to shut-down the vehicle, or executes the bypass mode when the input from the operator indicates that the operator intends to drive the vehicle in the city.

In some configurations, the system also includes an additive input line configured to selectively provide at least one of additives, lubricants, or emulsifier agents to the emulsification device to produce the emulsified fuel. The emulsification device may include a static mixer, a reactor, and a pump. In some implementations, the system also includes an emulsification recirculation line configured to selectively provide fluid communication between the emulsification device and the processed fuel tank. In these implementations, the control module executes an emulsification recirculation mode configured to continually recirculate emulsified fuel through the emulsification device and the processed fuel tank via the emulsification recirculation line. Additionally or alternatively, the system may also include a radiator/fan module, a cooling circuit, and a pump. The cooling circuit may provide fluid communication between the processed fuel tank and the radiator/fan module. The pump may be configured to circulate emulsified fuel stored within the processed fuel tank through the cooling circuit and the radiator/fan module to cool the emulsified fuel.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
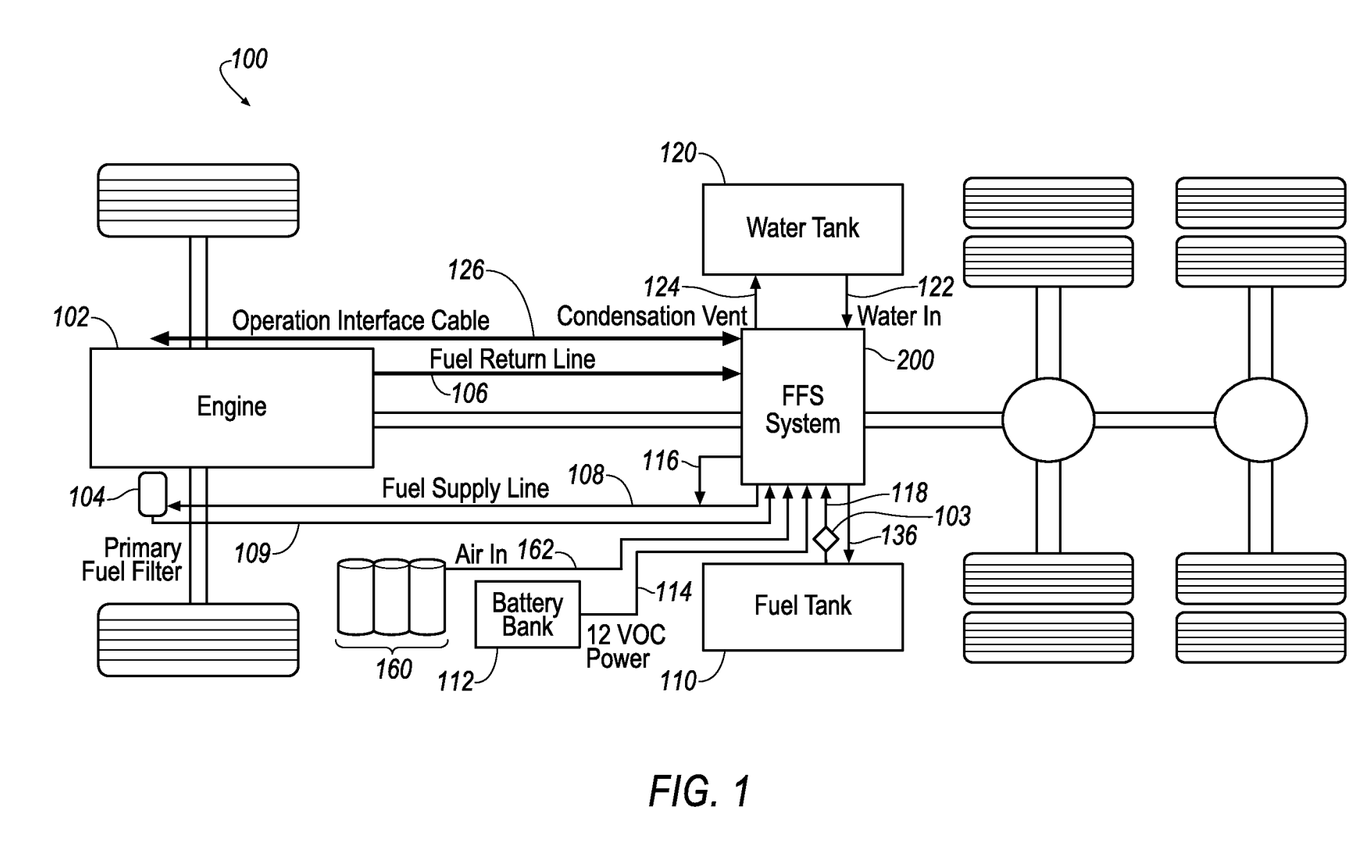
FIG. 1 is a schematic view of a vehicle fuel system including a fuel emulsion system.

Referring to FIG. 1, in some implementations, a fuel system 100 includes a fuel tank 110, a water tank 120, and a direct-connected fuel emulsion system 200 (FES). The fuel system 100 may feed virgin hydrocarbon fuel to an engine 102 or emulsions of water (i.e., water micro-droplets) in fuel (hereinafter "emulsified fuel") to the engine 102 based on one or more operating conditions of the fuel system 100. Emulsified fuel may provide both reductions in fuel consumption and emissions in engines, including compression ignition engines that operate off of diesel fuel. The FES 200 may provide the engine 102 to have the ability to start up and shut down using straight virgin fuel and only use emulsified fuel during periods when operating parameters, such as engine/load consumption, temperature, and settling time, are suitable. As used herein, virgin fuel may refer to any hydrocarbon fuel, such as conventional diesel or gasoline, that is not mixed or emulsified with water. Described in greater detail below with reference to FIG. 2, the mixing of small batches of emulsified fuel allows precise control to prevent fuel water separation, enables mixing of emulsified fuel using fuel and water from one or more fuel and water tanks 110, 120, respectively, and provides fuel temperature control for both heating and cooling. In some examples, small or micro batches of emulsified fuel include an 80:20 mix rate of fuel (e.g., diesel fuel) to water, whereat the emulsified fuel is consumed within minutes of being produced to eliminate any concern for instability resulting in the emulsified fuel. Emulsified fuel becomes unstable when the water droplets begin to separate from the fuel.

In some configurations, the FES 200 is incorporated onto a vehicle such as a car or truck and directly connects to an existing fuel system 100. In some examples, trucks include class 2 to 7 vehicles of the type with low-pressure fuel injector rails with hydraulic pressures being less than 20,000 pounds per square inch (psi). The FES 200 may be further utilized in high pressure fuel injector rails with hydraulic pressure of about 20,000 to about 40,000 psi in the injection rail. In such high pressure injection rails, additional filters, ceramic liners, lubricants, and/or other additives may be required to protect the pumps and injection rail. The FES 200, however, may be utilized in stationary land engines (generators), railroad locomotives, or marine-based engines that operate off of hydrocarbon fuels, such as diesel fuel. A liquid mixture of diesel fuel, water and one or more surfactants may be emulsified to atomize the diesel fuel beyond a unit injector's capability to increase surface area of the injected fuel mass by about four times and diesel droplet density by about 64 times. Increases in surface area of the injected fuel mass insures a more complete burn of the fuel, thereby creating Low Temperature Combustion (LTC), and thus, significantly reducing fuel consumption, engine temperatures, and emissions for unit injector style engines.

Figure 2:
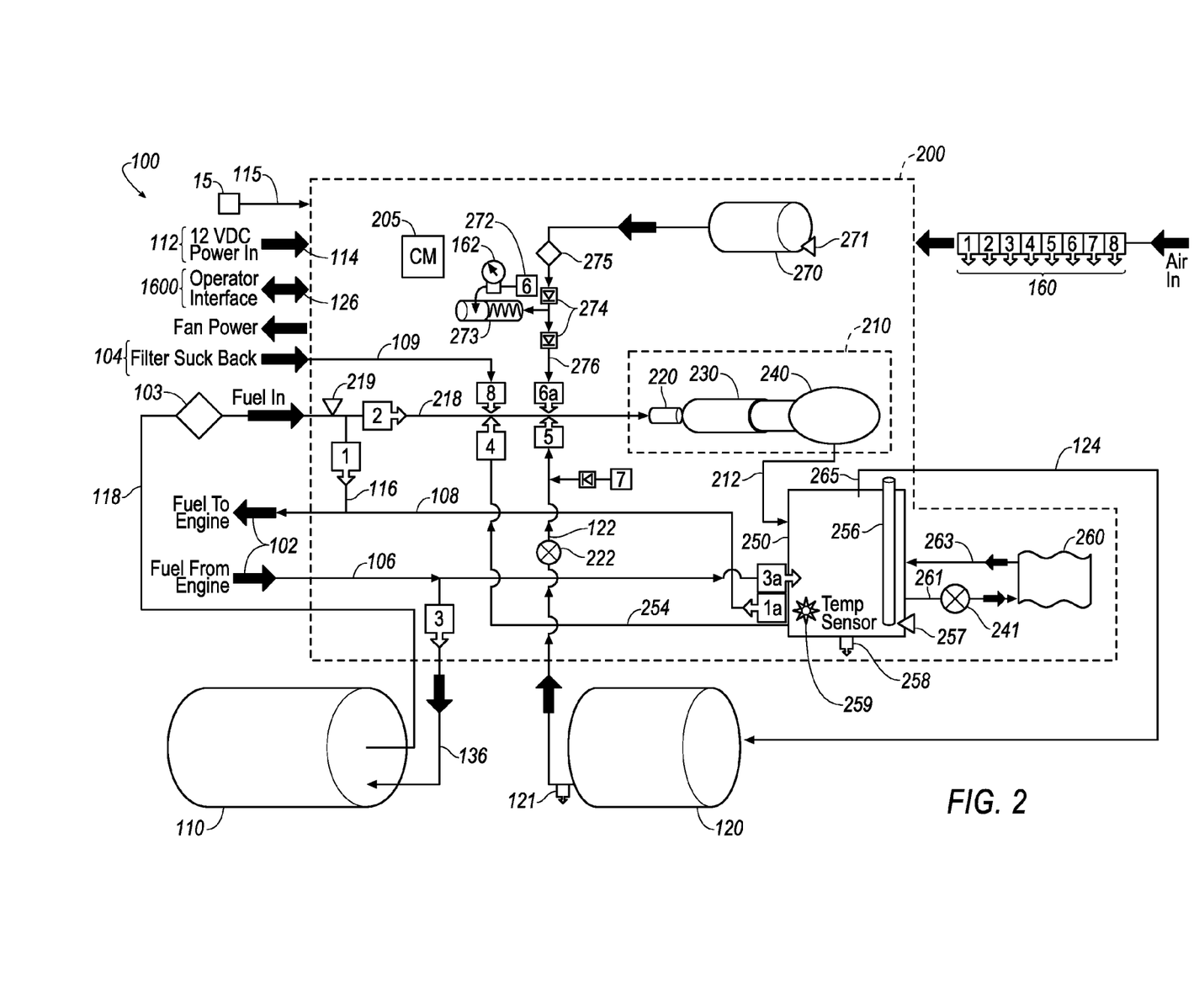
FIG. 2 is a schematic view of the fuel emulsion system of FIG. 1

The fuel tank 110 stores and provides fuel via a fuel line 118 to the FES 200. A fuel sensor 219 may be disposed in the fuel line 118 to monitor at least one of fuel pressure or flow rate of fuel within the fuel line 118. For example, the fuel sensor 219 may include a vacuum sensor. In some examples, more than one fuel tank 110 may be utilized. The fuel can be hydrocarbon fuel, and in some implementations, the fuel is diesel fuel. In some scenarios, the FES 200 may receive virgin fuel from the fuel tank 110 via the fuel line 118, and use fuel line 116 to feed the virgin fuel directly to a fuel rail providing pressurized virgin fuel to the engine 102. A virgin fuel inlet filter 103 may be disposed in the fuel line 118 to filter the virgin fuel provided from the fuel tank 110 to the FES 200. As used herein, "virgin diesel fuel" refers to diesel fuel that has not been emulsified with water. In other scenarios, the fuel line 118 can provide the virgin fuel from the fuel tank 110 and to the FES 200 for producing the emulsified fuel. Thereafter, the emulsified fuel produced by the FES 200 can be provided to the to the fuel rail of the engine 102 via a fuel supply line 108. As used herein, the terms "virgin fuel," "hydrocarbon fuel," "fuel" and "diesel fuel" will be used interchangeably. A primary fuel filter 104 may be utilized to filter out contaminants within the virgin fuel or the emulsified fuel provided from the fuel supply line 108 before the engine receives the virgin fuel or the emulsified fuel. The filter 104 may include a drain for returning the filtered out contaminants to an emulsification input line 218 via a primary fuel filter fuel suck back line 109, i.e., fuel suck back line. The fuel and contaminants returned to the FES 200 from the fuel suck back line may be mixed with virgin fuel and water (optionally) to produce the emulsified fuel by a reactor device 230 (FIG. 2).

The water tank 120 stores and provides water via water input line 122 to the FES 200 for producing the emulsified fuel. In some implementations, more than one water tank 120 may be utilized. The water tank 120 may include a freeze protection drain 121 that may automatically evacuate water stored within tank 120 if it becomes susceptible to freezing. Moreover, a condensate vent 265 (FIG. 2) of the FES system 200 may release water vapor via condensate line 124 to the water tank 120. The FES 200 may produce the emulsified fuel, store the emulsified fuel, circulate the emulsified fuel and provide the emulsified fuel to the engine 102. A fuel return line 106 may provide excess fuel returned from the engine 102 to the FES 200. In some examples, the fuel return line 106 provides virgin fuel back to the FES 200 for storage in the fuel tank 110 via virgin fuel return line 136. In other examples, the fuel return line 106 provides emulsified fuel back to the FES 200 for storage in a processed fuel tank 250 (FIG. 2).

In some implementations, the fuel system 100 includes one or more energy storage devices 112 (e.g., battery bank) configured to power components of the fuel system 100 and the FES 200 via connections 114. The energy storage devices 112 may refer to any batteries, alternators, and/or generators connected with the engine 102 system to power the direct-connected FES 200. In one example, the energy storage device 112 includes a 12 V DC battery. A valve control system 160 may be utilized to actuate flow control valves of the fuel system 100 and the FES 200. The valve control system 160 may be a pneumatic valve system, a fluidic valve system, or a combination of a pneumatic valve system and a fluidic valve system.

In some examples, an operator interface cable 126 may provide feedback parameters associated with the FES 200 for display upon an operator interface device 1600. For instance, the feedback parameters may indicate whether emulsified fuel is being produced, whether emulsified fuel is being circulated, whether virgin fuel or emulsified fuel is being provided to the engine 102, whether additives (e.g., combustion enhancers, emulsifying agents, lubricant additives) are being provided for use by the FES, whether any faults in the FES 200 are detected, and/or various other parameters associated with operation of the FES 200. The operator interface cable 126 may further provide commands initiated by the operator of the vehicle for controlling the FES 200.

Referring to FIG. 2, the FES 200 includes a plurality of flow control devices 1-8 activated between open and closed positions by the valve control system 160. Each flow control device is operative to restrict or allow fluid to pass therethrough. While the examples refer to flow control valves, the flow control devices can include any device capable of controlling fluid flow through the FES 200. For example, solenoids can be used in place of any one of the flow control valves 1-8. An air regulator and gage 162 may regulate the air pressure for individually controlling each of the flow control valves 1-8. The FES 200 may include the emulsification device 210, the processed fuel tank 250 and a radiator fan/module 260. The processed fuel tank 250 holds the small batches of emulsified fuel produced, and receives emulsified fuel captured from the fuel supply line 108 via the fuel return line 106, the primary fuel filter 104 via the fuel suck back line 109, and/or components of the engine 102. The FES 200 ensures that emulsified fuel always remains separate from virgin fuel provided from the fuel tank 110. The emulsification device 210 may receive water and fuel via an emulsification input line 218 and output emulsified fuel to the processed fuel tank 250 via a tank input line 212. In other examples, the emulsification input line 218 provides water and fuel together or separately to the processed fuel tank 250 and the emulsification device 210 receives the water and fuel via the emulsification input line 218 and outputs emulsified fuel to the processed fuel tank 250 via the tank input line 212. In some examples, the emulsification device 210 includes a static mixer 220, a reactor 230, and a pump 240.

The FES 200 includes a control module 205 that monitors one or more operating parameters, selects an appropriate operating mode for the system 100 based on the monitored operating parameters, and executes operation of the FES 200 in the selected operating mode by commanding the valve control system 160 to activate each of the flow control valves 1-8 between one of the open position or the closed position. The control module 205 and the operating parameters monitored by the control module 205 will be described in greater detail below.

During a bypass mode, the engine 102 operates off of virgin fuel provided from the fuel tank 110 via fuel lines 118, 116 to the engine 102. The control module 205 may select and execute the bypass mode during engine start-ups and engine shut-downs to eliminate cold start or fuel system corrosion issues. In some implementations, the bypass mode is a default, non-powered state of the FES 200. In the bypass mode, the flow control valve 1 is opened for the virgin fuel to flow to the engine 102 and the flow control valve 2 is closed to restrict fuel from fuel line 118 from entering the emulsification input line 218 fluidly connected to the emulsification device 210. Excessive virgin fuel not combusted by the engine 102 may be returned back to the fuel tank via the fuel return line 106 and the virgin fuel line 136. Here, the flow control valve 3 is opened such that fuel can flow from the fuel return line 106 to the virgin fuel line 136. Additionally, flow control valve 3a may be closed to restrict virgin fuel returned from the engine 102 from flowing into the processed fuel tank 250. In some examples, flow control valves 1 and 3 are generally open valves while valves 2 and 3a are generally closed valves to provide virgin fuel to the engine 102. When desired operating conditions of the vehicle are achieved, the control module 205 may command the valve control system 160 to close valves 1 and 3 and open valves 2 and 3a to execute an emulsified fuel run mode whereat the processed fuel tank 250 provides emulsified fuel produced by the emulsification device 210 to the engine 102. In some examples, one or more of the flow control valves 1-8 include solenoids that may be directly activated between the open and closed positions by the control module 205.

In some implementations, the control module 205 executes an emulsification production mode to produce the emulsified fuel. In some scenarios, the device 210 may produce the emulsified fuel concurrently while the engine is operating off virgin fuel. Thus, the control module 205 may execute the emulsification production mode to produce the emulsified fuel while simultaneously executing the bypass mode to provide the engine with virgin fuel. In some examples, the emulsification production mode occurs a short period of time after the vehicle (and engine 102) has started from a cold start. As used herein, the term "cold start" refers to starting the engine 102 after a predetermined period of time has elapsed since the engine was shut down. In the emulsification production mode, the control module 205 commands the valve control system 160 to open the flow control valves 1, 2, 3, and 5, and close the flow control valves 3a and 1a. The open flow control valve 5 provides water from the tank 120 via water line 122 to the emulsification input line 218, while the open flow control valve 2 provides fuel from the fuel tank 110 via the fuel line 118 to the emulsification input line 218. The emulsification input line 218 may provide the received water and fuel to the emulsification device 210 for producing the emulsified fuel. Thereafter, the processed fuel tank 250 may receive the emulsified fuel via tank input line 212. In some examples, the water line 122 may include a check valve 7 for pressurizing the water line 122 to permit the evacuation of water into the tank 120, and thereby purge the system in the event that the control module 205 detects freezing temperatures. In some examples, a water sensor may monitor the amount of water metered to the emulsification input line 218. In other examples, a water in fuel (WIF) sensor 257 at the processed fuel tank 250 may measure the amount of water within the processed fuel tank 250 and notify the control module 205 to re-process fuel as needed. In some implementations, the emulsification production mode provides the ability to produce emulsified fuel in colder weather with automatic winterizing that may include adding methanol or alcohol to keep water stored in the water tank 120 above freezing and/or integrating commercially available heating devices to heat the stored water. The emulsification production mode enables the emulsified fuel to be produced in small batches as required based on operating conditions of the engine 102 and the FES 200 as monitored by the control module 205. The ability to produce small batches of emulsified fuel on-board, in real-time and in-line, enables the ability to manage semi-stable emulsion (due to a low amount of surfactant) based upon engine/load consumption, engine temperature, ambient temperature, and settling time. Conversely, known fuel emulsification systems produce emulsified fuel at a constant state or in large batches that are not in real time or in-line. During the emulsification production mode, a liquid including virgin fuel, a fuel and water mixture, or emulsified fuel within the processed fuel tank 250 may be circulated through the radiator fan module 260 to cool the solution. The radiator/fan module 260 may include any combination of a radiator and a fan for cooling the circulated liquid. The fan may include a motor electrically powered by the energy storage devices 112. To facilitate the cooling circulation through the radiator/fan module 260, a slave pump 241 may draw the solution from the processed fuel tank 250 to the radiator/fan module via radiator input line 261 and provide the liquid mixture back to the processed fuel tank 250 via radiator out line 263. Accordingly, the radiator input and output lines 261, 263 provide a cooling circuit for circulating virgin fuel, fuel and water mixtures, or emulsified fuel stored within the processed fuel tank. The cooling circuit may also prevent separation of emulsified fuel settling within the processed fuel tank, as well as facilitate homogenization of a water and fuel mixture. The FES 200 may optionally employ the slave pump 241 to reduce imposing a load on the pump of the emulsification device 210. However, the FES 200 may employ the pump 240 instead of the slave pump 241 facilitate circulation through the radiator/fan module 260.

In some examples, the emulsification production mode is divided into one or more production sub-modes that may occur prior to producing the emulsified fuel or during production of the emulsified fuel. For instance, the control module 205 may execute a pulsed fill production sub-mode shortly after a cold start to begin introducing fuel from the fuel tank 110 to the processed fuel tank 250. Since the emulsified fuel to be produced requires a higher proportion of fuel to water (e.g., 80% fuel and 20% water), the pulsed fill sub-mode begins to introduce fuel to the processed fuel tank 250 while delaying the introduction of water from the water tank 120. In the pulsed fill sub-mode, the control module 205 opens the flow control valve 2 (e.g., by commanding valve control system 160), whereby fuel flows from the fuel tank 110 to the emulsification device 210 via the fuel line 118 and the emulsification input line 218, and then from the emulsification device 210 to the processed fuel tank 250 via the tank input line 212. Here, the flow control valves 1a and 3a are closed to permit the fuel to fill the processed fuel tank 250. The control module 205 may simultaneously execute the bypass mode to provide virgin fuel for running the engine 102 from the fuel tank 110. Thus, the control module 205 may open the flow control valve 3 so that the virgin fuel may flow to the engine 102 via the fuel line 116. Moreover, the control module 205 may open the flow control valve 3 to permit virgin fuel to be returned to the fuel tank 110 from the engine 102 via the virgin fuel return line 136. Upon completing the pulsed fill mode, such as when a desirable amount of fuel is introduced to the processed fuel tank 250, the control module 205 may activate the flow control valve 5 to the open position to provide water from the water line 122 to the emulsification input line 218 such that the emulsified fuel can be produced.

The processed fuel tank 250 is utilized for storing emulsified fuel produced during the emulsification production mode. In some implementations, the processed fuel tank 250 includes a fuel level sensor 256 for measuring the amount of emulsified fuel stored in the tank 250. In some examples, the processed fuel tank 250 stores a desired amount of emulsified fuel. When the fuel level sensor 256 detects that that the amount of emulsified fuel is less than the desired amount, the emulsification production mode can be initiated to produce more emulsified fuel to increase the amount of emulsified fuel stored within the processed fuel tank 250. In some implementations, the processed fuel tank 250 includes the WIF sensor 257 for detecting a WIF separation ratio of the emulsified fuel stored within the tank 250. The emulsification tank 250 may further include a temperature sensor 259 for measuring the temperature of the stored emulsified fuel. The emulsified fuel may be required to maintain a temperature at or above a desired temperature. If the temperature sensor 259 detects that the temperature of the emulsified fuel is less than the desired temperature, the emulsified fuel can be heated by a heating unit in thermal communication within the tank 250. The energy storage devices 112 may power the heating unit in thermal communication within the tank 250. In some examples, the emulsified tank 250 includes a manual tank drain 258 for draining emulsified fuel stored therein. The condensation vent 265 may release gas build-up (e.g., water vapor) within the tank 250 and provide the released water vapor back to the water tank 120 via the condensate line 124.

In some implementations, the control module 205 executes an emulsification recirculation mode to continually recirculate the emulsified fuel through the emulsification device 210 and the processed fuel tank 250. Specifically, emulsified fuel within the processed fuel tank 250 may recirculate via a recirculation loop 254 back to the emulsification input line 218, through the emulsification device 210, and back to the processed fuel tank 250 via tank input line 212. Accordingly, the control module 205 executes the emulsification recirculation mode by activating the flow control valve 4 to the open position to provide the emulsified fuel from the recirculation loop 254 to the emulsification input line 218. Recirculating the emulsified fuel continuously may maintain stability of the emulsified fuel and prevent WIF separation. In other words, the emulsification recirculation mode may be operative to ensure that the water emulsified in the fuel is homogenized during ongoing operation of the FES 200 and the engine 102. In some examples, the emulsification recirculation mode executes simultaneously while the emulsification production mode executes. In other examples, the emulsification recirculation mode executes while the bypass mode occurs. In even other examples, the emulsification recirculation mode executes simultaneously while both the emulsification production mode and the bypass mode execute. In even yet other examples, the emulsification recirculation mode executes while the emulsification production mode and the bypass mode are not executing.

The control module 205 may be programmable to execute the emulsification recirculation mode based upon time, temperature of the emulsified fuel stored within the processed fuel tank 250, the WIF separation ratio of the emulsified fuel stored within the processed fuel tank 250, and/or other emulsion component ratios. For instance, when the emulsified fuel sits and settles within the tank 250 for too long, the water and the fuel emulsion may begin to separate. In some implementations, when the control module 205 detects from the WIF sensor 257 that a predetermined level of WIF separation is reached, the control module 2015 may execute the emulsification recirculation mode to recirculate the emulsified fuel continually through the emulsification device 210 to achieve a stable and homogenous emulsified fuel. Additionally or alternatively, when the emulsified fuel settles in the processed fuel tank for a predetermined elapsed period of time, the control module 205 may execute the emulsification recirculation mode to recirculate the emulsified fuel continually through the emulsification device 210 to achieve a stable and homogenous emulsified fuel. In some examples, the emulsified fuel circulates through the radiator/fan module 260 to cool the emulsified fuel.

In some implementations, the control module 205 executes an emulsified fuel run mode to operate the engine 102 with the emulsified fuel produced by the emulsification device 210. During the emulsified fuel run mode, the control module 205 opens the flow control valve 1a and closes the flow control valve 1. The open flow control valve 1a provides the emulsified fuel to the fuel rail of the engine 102 via the fuel supply line 108, while the closed flow control valve 1 restricts the virgin fuel from feeding the engine 102 via the fuel line 116. In some examples, the control module 205 closes valves 2 and 5 such that emulsified fuel is not produced while the emulsified fuel run mode is executing. However, the control module 205 may decide to execute the emulsification production mode by opening valves 2 and 5 to produce more emulsified fuel as needed while the run mode simultaneously executes. Flow control valve 4 may be opened or closed while the run mode executes depending upon whether or not recirculation of emulsified fuel within the processed fuel tank 250 is needed. Moreover, the emulsified fuel may continuously circulate through the radiator/fan module while the emulsified fuel run mode executes. In some scenarios, the control module 205 may close the flow control valve 3 and open the flow control valve 3a to permit unused emulsified fuel to be returned from the engine 102 back to the processed fuel tank 260. In some examples, the control module 205 executes the run mode when the engine 102 reaches a predetermined engine temperature. In some examples, the control module 205 executes the run mode when the engine load and/or engine speed are within specific ranges. The control module 205 may communicate with an engine control module 15 to receive engine operating parameters, such as, but not limited to, engine temperature, engine load, and engine speed, from the engine control module 15.

In some examples, the FES 200 includes an additive tank 270 for providing chemical additives to the emulsification input line 218. The additive tank 270 may include additives such as, but not limited to, additives, lubricating additives, and/or emulsifier agents. In some examples, anti-freeze additives may be added to the water to reduce the risk of the water freezing. Emulsifier agents may be utilized to assist in facilitating the emulsified fuel produced by the emulsification device 210 and/or to assist in stabilizing the emulsified fuel once produced and undergoing recirculation. Due to the ability of the emulsified fuel to be continuously processed by the emulsification device 210 in small batches and be recirculated via the emulsification recirculation line 254, the amount of emulsifier agents provided in the emulsified fuel can be less than 0.2%. This very limited amount of emulsifying agent enables the emulsifying agent that surrounds the water micro-droplets to be burned off quickly, which allows the water droplets to vaporize at the beginning of the ignition cycle in the emulsified fuel operation mode. Generally, known emulsified fuel systems utilize much higher ratios (e.g., 10 to 20 times or more) of emulsifying agents to ensure longer term emulsion stability, which in turn retards the timing of the water droplet vaporization and subsequently loses optimal fuel efficiency gains. The additives may be metered and provided via an additive input line 276 to the emulsification input line 218 when the control module 205 opens the flow control valve 6a. In some examples, the additives pass through an additive orifice and/or an additive filter 275 disposed within the additive input line 276. The additive filter 275 may include an emulsifier filter. When an additive sensor 271 in communication with the control module 205 determines additives are available, the control module 205 may open an additive flow control valve 6 to facilitate the flow of additives out of the additive tank 270 and through check valves 274 associated with the additive input line 276. Specifically, the opening of the flow control valve 6 permits an additive injector 273 to inject the additives from the additive tank 270 to the emulsification input line 218 via the additive input line 276. In some examples, when the additives include anti-freeze additives, the control module 205 may open flow control valves 6 and 6a in response to a signal from the temperature sensor 259 within the emulsification tank 250 indicating that the temperature of the emulsified fuel stored therein is less than a desired temperature.

In some scenarios, the control module 205 executes one or more fill phases while simultaneously executing the emulsified fuel run mode at which at least one of fuel from the fuel tank 210, additives from the additive tank 260, or water from the water tank 220 is/are provided to the processed fuel tank 250 while the emulsified fuel from the processed fuel tank 250 feeds the engine 102. The fill phases may include a fuel and additive fill phase, a fuel fill phase, a water and additive fill phase, or a water fill phase. Emulsified fuel stored within the processed fuel tank 250 may circulate through the radiator/fan module 260 as set forth above.

During the fuel and additive fill phase, the control module 205 opens the flow control valves 2, 6a, 6 to provide additives (e.g., emulsifiers) from the additive tank 260 and fuel from the fuel tank 110 to the emulsification input line 218. Here, the pump 240 may draw the mixture of additives and fuel through the emulsification input line 218 and the tank input line 212 for storage within the processed fuel tank 250. The control module 205 may close the flow control valve 4 so that emulsified fuel is not recirculated via the recirculation loop 254. Additionally, the control module 205 may close the flow control valve 5 to block water from entering the emulsification input line 218 via the water line 122 while the fuel and additives are filling the processed fuel tank.

During the fuel fill phase, only fuel from the fuel tank 110 is provided to the emulsification input line. Here, the control module 205 may transition from executing in the fuel and water fill phase and execute in the fuel fill phase by activating the flow control valve 6a to the closed position (e.g., by commanding the valve control system 160) to restrict the emulsification input line 218 from receiving the additives from the additive input line 276. If the control module 205 determines additives are needed, the control module 205 may activate the flow control valve 6a to the open position to permit the emulsification input line 218 to receive the additives from the additive input line.

During the water fill phase, the emulsified fuel run mode may continue to execute as set forth above while the control module 205 opens the flow control valve 5 to provide water from the water tank 120 via the water line 122 to the emulsification input line 218. The control module 205 may transition to the water fill phase to produce additional emulsified fuel upon filling the processed fuel tank 250 with an appropriate amount of fuel and/or additives during the fuel and additive fill phase or the fuel fill phase. Accordingly, the control module 205 may now close the flow control valves 2 and 6a so that no more fuel or additives are provided to the processed fuel tank 250 during the water fill phase. Simultaneously, the control module 205 may open the flow control valve 4 to allow a liquid mixture composed of water and fuel (or water fuel and/or additive(s)) to recirculate through the emulsification device 210 and the processed fuel tank 250 via the recirculation loop 254, the emulsification input line 218, and the tank input line 212. As the pump 240 and open flow control valves 4 and 5 cooperate to recirculate the liquid mixture joined at the emulsification input line 218, the emulsification device 210 may produce additional emulsified fuel.

The emulsification device 210 changes the liquid mixture composed of water and fuel (or water, fuel, and/or additive(s)) joined at the emulsification input line 218 into a vapor state, followed by a reconstitution back to the liquid state. The emulsification device 210 may include any features described in U.S. Pub. No. 2013/0302494 filed on Mar. 15, 2013, the disclosure of which is considered part of the disclosure of this application and is hereby incorporated by reference in its entirety. In some implementations, the static mixer 220 is implemented for pre-mixing the liquid mixture for emulsification. In some examples, the pump 240 draws the liquid mixture output from the static mixer 220 through a serious of varying cross sectional area orifices within the reactor 230 to increase the liquid velocity and lower the fluid pressure such that the liquid changes into the vapor state, followed by the reconstitution back to the liquid state. In other examples, the pump 240 may be posited upstream of the reactor 230 for pumping the mixture through the reactor 230. In some examples, the reactor 230 may include one or more walls for shearing the liquid mixture such that the transformation to the vapor state occurs. In some implementations, the reactor 230 includes a tube having a first diameter that opens up downstream to a second diameter that is larger than the first diameter. The liquid mixture of fuel and water (and additives and/or emulsifying agents) travelling through the reactor 230 having the increased tube diameter may provide a pressure to thereby create an expansion of the liquid mixture exiting the reactor 230. In a non-limiting example, the first diameter is a $5/16^{th}$ inch tube and the second diameter is a one inch tube. Fluid restriction orifices may be positioned along the emulsification device 210, the recirculation loop 254, the water line 122, and/or the emulsification input line 218 to control fluid metering through the emulsification device 210.

In some implementations, the control module 205 executes a water blow out mode to remove water from the water line 122 for return back to the water tank 120. The water blow out mode may execute while simultaneously executing the emulsified fuel run mode or the bypass mode as set forth above. The control module 205 may also execute the water blow out mode when the vehicle is expected to be shut-down for an extended period of time to prevent water within the water line 122 from freezing. The control module 205 may also open the freeze protection drain 121 to drain the water from the water tank 120 to prevent the water from freezing. Accordingly, the control module 205 may monitor ambient temperature to determine whether or not the water is at risk of freezing, and chose to drain the water 120 if freezing is expected. In some configurations, the water tank 120 may utilize a heater powered auxiliary fuels or by the energy storage devices 112 to prevent the water within the tank 120 from freezing.

The control module 205 may execute a suck back mode to return semi-stable emulsified fuel captured by the fuel filter 104 back to the processed fuel tank 250 via the suck back line 109, the emulsification input line 218, and the tank input line 212. During the suck back mode, the control module 205 opens the flow control valve 8 to allow the fuel suck back line 109 to drain the settled out water and/or semi-stable emulsified fuel to the emulsification input line 218. In doing so, the emulsification input line 218 may provide the semi-stable emulsified fuel to the emulsification device 210 for mixing with virgin fuel and/or water to produce additional emulsified fuel. In some examples, the suck back mode executes concurrently while the emulsified run mode executes. In these examples, the control module opens flow control valves 1a and 8 and closes flow control valves 1, 2, and 3. The control module 205 may optionally open flow control valve 3a so that semi-stable emulsified fuel provided to the engine 102 via the fuel supply line 108 can be returned to the processed fuel tank 250 via the fuel return line 106.

In some scenarios, the control module 205 executes the suck back mode at periodic/programmable intervals to reclaim the semi-stable emulsified fuel while the engine 102 is running. Due to minimal surfactants within the emulsified fuel, water may separate from the fuel. Thus, semi-stable emulsified fuel may be periodically sucked out of the bottom of the filter 104 while components of the FES 200 are simultaneously bled out with virgin fuel to remove any settled emulsion that can lead to corrosion of components of the FES 200 and the engine 102.

In some scenarios, the control module 205 executes the suck back mode prior to engine shut-down in order to reclaim the semi-stable emulsion, whereat a power bleed of virgin fuel is provided to the fuel supply line 108 from the fuel line 116 to feed the engine 102 while the emulsified fuel evacuates. Evacuating the emulsified fuel from the fuel system 100 prior to shut-down provides that emulsified fuel will not be collected within components of the engine, the fuel rail, or the injectors that may result in harmful corrosion. Emulsified fuel may cause damage to components of the engine 100 if left to settle when the vehicle is shut-down. Thus, the suck back mode purges the engine of emulsified fuel, water, and other contaminants prior to shutting down the engine. In some examples, an operator of the vehicle may notify the control module 205 via the operator interface cable 126 that the operator intends to shut down the vehicle for an extended period, e.g., longer than 15 minutes. Upon receiving a shut-down notification, the control module 205 may execute the suck back mode to purge the engine 102 of the emulsified fuel. Specifically, the control module 205 opens flow control valves 5 and 3a so that emulsified fuel is returned to the process fuel tank 250 via the fuel return line 106 and filtered out contaminants are provided to the processed fuel tank via the filter suck back line 109, the emulsification input line 218, and the tank input line 212. The processed fuel tank 250 may store the returned emulsified fuel until a subsequent operation of the vehicle allows for the engine 102 to run off of the emulsified fuel. While purging out the emulsified fuel and filtered out settled water, the control module 205 may execute the bypass mode by opening the flow control valve 1 and closing the flow control valve 2 to operate the engine 102 off of the power bleed of virgin fuel from the fuel tank 110 via the fuel line 116. Generally, the control module 205 executes the suck back mode prior to shut-down when the FES 200 is operating in the emulsified fuel run mode. However, when the engine 102 is operating off of virgin fuel in the bypass mode prior to shut down, the control module 205 may choose not to execute the suck back mode.

Figure 3:
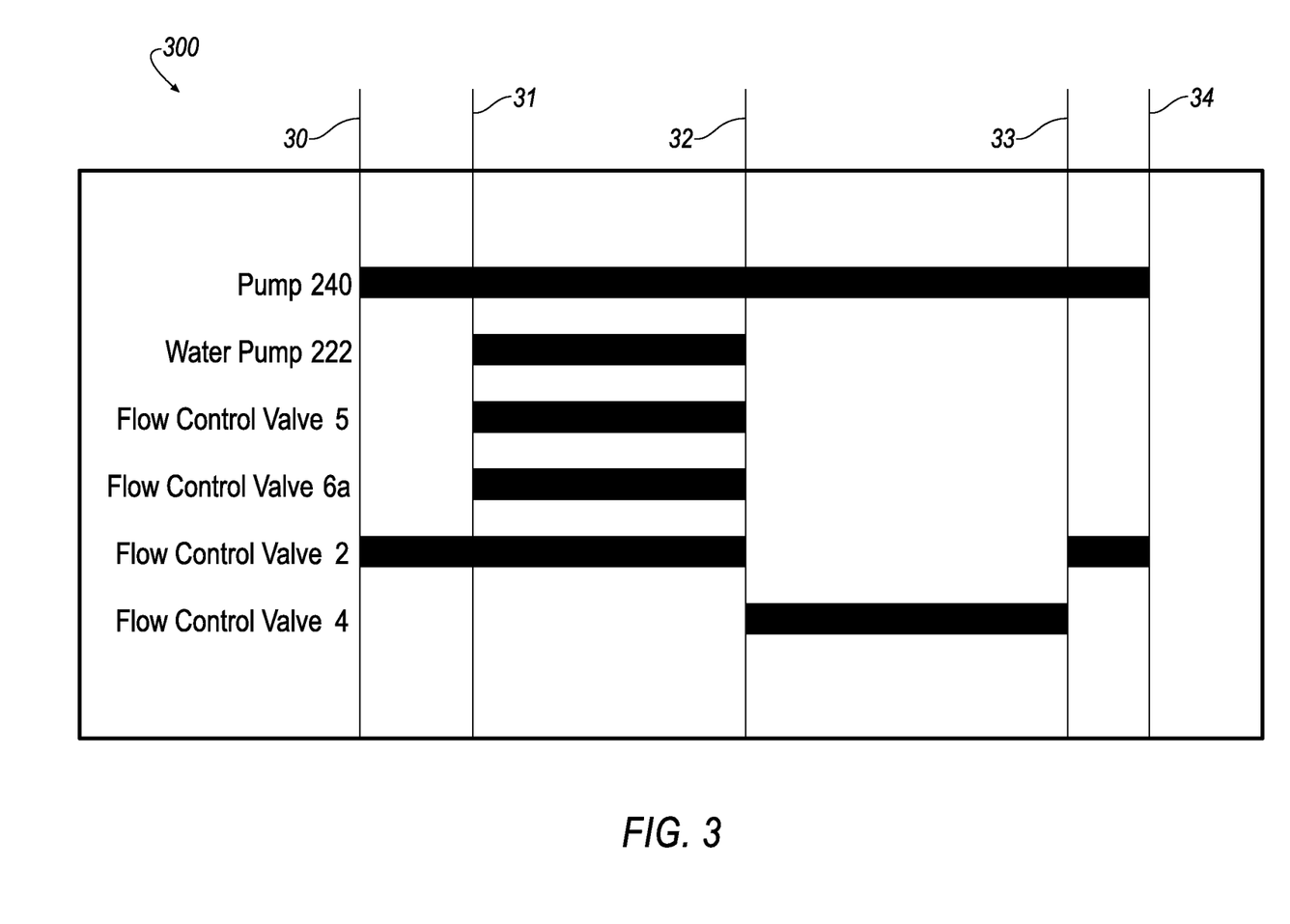
FIG. 3 is a plot showing operational states of components of the fuel emulsion system of FIG. 1 when an initial fill mode and an initial emulsification recirculation mode execute.

Referring to FIG. 3, plot 300 shows operational states of components of the FES 200 when an initial fill mode and an initial emulsification recirculation mode execute. The initial fill and recirculation modes may execute during a cold start after the engine was shut down for an extended period of time. The initial fill mode refers to the control module 205 executing the emulsification production mode to fill the processed fuel tank 250 with fuel from the fuel tank 100, water from the water tank 120, and emulsifiers from the additive tank 270. The horizontal x-axis denotes time increasing from left to right and the vertical y-axis denotes operating states of the pump 240, the water pump 222, and each of the flow control valves 2, 4, 5, and 6a of FIG. 2. Shaded bars indicate operation of associated ones of the pump 240 and the water pump 222, while the shaded bars indicate the open state for associated ones of the flow control valves 2, 4, 5, and 6a. Vertical lines 30, 31, 32, 33, 34 indicate time periods during at least one of the initial fill mode or the initial recirculation mode. The bypass mode may execute during the initial fill and recirculation modes to feed the engine 102 with virgin fuel.

At time 30, the control module begins executing the initial fill mode by operating the pump 240 and opening the flow control valve 2 to draw fuel from the fuel tank 110 via fuel line 118, emulsification input line 218, and tank input line 212 for filling the processed fuel tank 250. Between times 30 and 31 (e.g., a water delay period), the flow control valves 4, 5, and 6a are closed. The water delay period corresponds to the pulsed fill production sub-mode described above. At time 31, the control module 205 opens flow control valves 5 and 6a and operates the water pump 222 while the flow control valve 2 remains open, the pump 240 continues to operate and the flow control valve 4 remains closed. In doing so, the pump 240, the water pump 222, and the open flow control valves 2, 5, and 6a cooperate to join the fuel from the fuel tank 110, the water from the water tank 120, and the emulsifiers from the additive tank 270 at the emulsification input line 218 for producing the emulsified fuel at the emulsification device 210. The emulsified fuel produced by the emulsification device 210 fills the processed fuel tank. At time 32, the processed fuel tank 250 is filled with the emulsified fuel and the control module 205 ends the initial fill mode and begins executing the initial recirculation mode. The fuel level sensor 256 may notify the control module 205 when the processed fuel tank 250 is full. During the initial recirculation mode, the control module 205 closes the flow control valves 2, 5, and 6a and opens the flow control valve 4 such that the recirculation loop 254 is permitted to recirculate the emulsified fuel produced during the initial fill mode continuously through the emulsification device 210 and the processed fuel tank 250. The control module 205 continues operating the pump 240 to recirculate the emulsified fuel and stops the water pump 222 during the initial recirculation mode. The initial recirculation mode executes until the control module 205 closes the flow control valve 4 at time 33. Between times 33 and 34 the control module 205 executes the pulsed fill production sub-mode to replenish the processed fuel tank with virgin fuel as needed by opening the flow control valve 2 and operating the pump 240 to draw the fuel from the fuel tank 110. Thereafter, the control module may execute the emulsified fuel run mode to feed the engine 102 with the emulsified fuel from the processed fuel tank 250 via the fuel supply line 108. The elapsed time between times 30 and 34 may correspond to an initial start-up time for the engine to be sufficiently warmed up such that it may run off of the emulsified fuel.

In some scenarios, the FES 200 will automatically time out after standing for a period of time or if the WIF sensor 257 indicates water/fuel separation within the processed fuel tank 250. In these scenarios, the control module 205 will execute a short emulsification recirculation mode to reconstitute the liquid mixture of water, fuel, and emulsifiers to a stabilized emulsified fuel. In some examples, the initial fill mode occurs when air pressure in the vehicle can be monitored by the control module 205. Air pressure may be monitored when wheel speed is greater than zero and/or the engine has been fueled and spinning for more than a predetermined period of time (e.g., 20 minutes). The control module 205 may execute the initial fill mode to fill the processed fuel tank 250 with emulsified fuel produced from the emulsification device 210 until the tank reaches a predetermined high point, as measured by the fuel level sensor 256 within the processed fuel tank 250. In some examples, faults may occur if the initial fill takes too long to complete fill.

Figure 4:
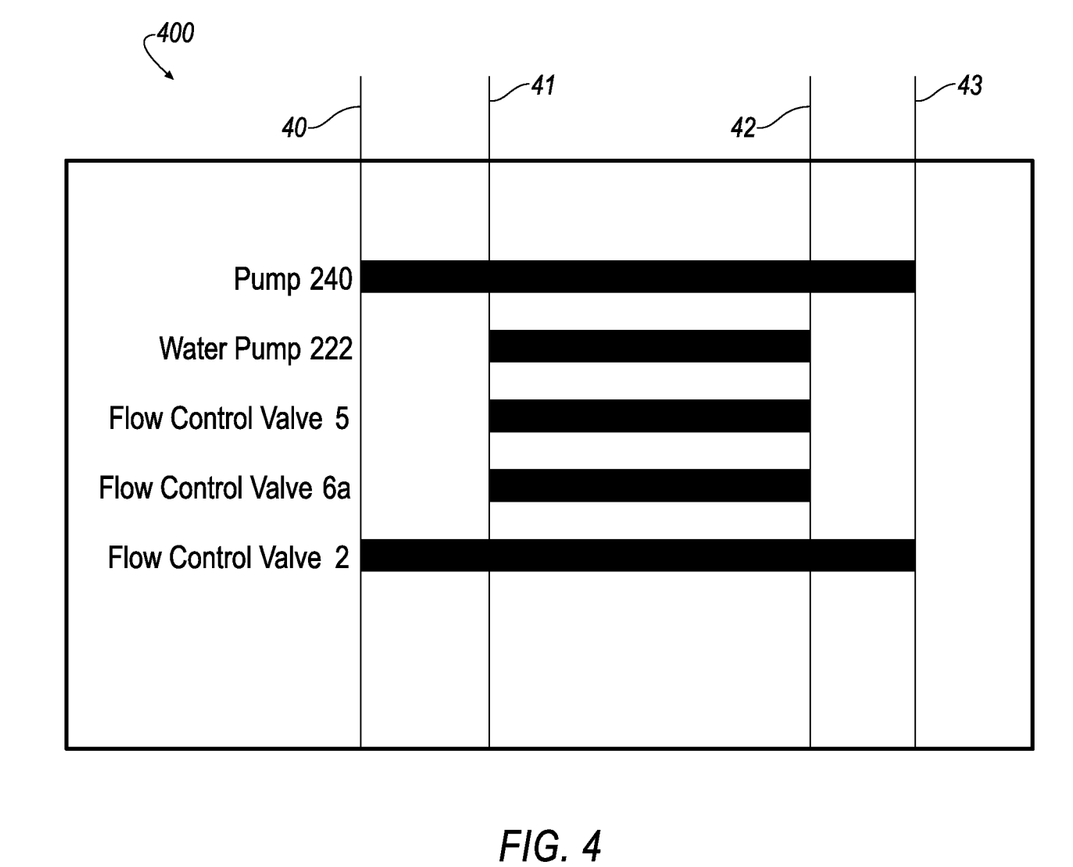
FIG. 4 is a plot showing operational states of components of the fuel emulsion system of FIG. 1 during fill phases when an emulsified fuel run mode executes.

FIG. 4 illustrates a plot 400 showing operational states of components of the FES 200 of FIG. 2 during fill phases when the emulsified fuel run mode executes. During the emulsified fuel run mode, the processed fuel tank 250 feeds the engine 102 with emulsified fuel via the fuel supply line 108. The fuel level sensor 256 may notify the control module 205 that the emulsified fuel within the processed fuel tank 250 is too low, and the control module 205 may commence executing one or more fill phases to produce new emulsified fuel at the emulsification device 210 for replenishing the processed fuel tank 250. The horizontal x-axis denotes time increasing from left to right and the vertical y-axis denotes operating states of the pump 240, the water pump 222, and each of the flow control valves 2, 5, and 6a of FIG. 2. Shaded bars indicate operation of associated ones of the pump 240 and the water pump 222, while the shaded bars indicate the open state for associated ones of the flow control valves 2, 5, and 6a are in the open state. Vertical lines 40, 41, 42, 43, 44 indicate time periods during the fill phases while executing the emulsified fuel run mode.

At time 40, the control module 205 executes a fuel fill phase by opening the flow control valve 2 and operating the pump 240 to draw fuel from the fuel tank 110 via fuel line 118, emulsification input line 218, and tank input line 212 for filling the processed fuel tank 250. The control module 205 may execute the fuel fill phase in response to the fuel level sensor 256 indicating that the level of emulsified fuel is too low. Between times 40 and 41 (e.g., a water delay period), the flow control valves 5 and 6a are closed to prevent the emulsification input line 218 from receiving water and additives via the water and additive lines 122, 276, respectively. At time 41, the control module 205 executes a fuel, water, and additive fill phase by opening the flow control valves 5 and 6a and operating the water pump 222 while the flow control valve 2 remains open and the pump 240 continues to operate. In doing so, the pump 240, the water pump 222, and the open flow control valves 2, 5, and 6a cooperate to join the fuel from the fuel tank 110, the water from the water tank 120, and the emulsifiers from the additive tank 270 at the emulsification input line 218 for producing the emulsified fuel at the emulsification device 210. The emulsified fuel produced by the emulsification device 210 fills the processed fuel tank. In some examples, a liquid mixture composed of the fuel, the water, and the additive(s) are received within the processed fuel tank and the control module 205 opens the flow control valve 4 to recirculate the liquid mixture through the recirculation loop 254, the emulsification device 210 and the processed fuel tank 250 to produce the additional emulsified fuel.

At time 42, the processed fuel tank 250 is filled with the emulsified fuel and the control module 205 ends the fill phases. The fuel level sensor 256 may notify the control module 205 when the processed fuel tank 250 is full. Since the emulsified fuel run mode is still executing, and therefore the engine 102 is consuming the emulsified fuel from the processed fuel tank, the control module 205 may commence a subsequent execution of the fuel fill phase by maintaining operation of the pump and leaving the flow control valve closed to draw additional fuel from the fuel tank 110. As with the fill phase between times 40 and 41, the control module 205 closes the flow control valves 5 and 6 and stops the water pump 222 between times 42 and 43.

Referring back to FIG. 2, in some implementations, an electrical control system, supervised by the control module 205, is utilized to execute the various operating modes of the FES 200. In some examples, the electrical control system includes a CAN bus interface. The control module 205 may also communicate with an engine control module 15 via signal path 115 to gather engine operating parameters monitored by the engine control module 15. The engine operating parameters may include, but are not limited to, engine temperature, engine speed, and engine load. Example CAN bus interfaces may include J1939 and/or SAE 1708/1597 protocols. The electrical control system can be powered by the one or more energy storage devices 112 (e.g., a 12V DC battery). The electrical control system may be utilized to operate the plurality of sensors of the FES 200 and fuel system 100 such as, but not limited to, monitoring the fuel temperature in the emulsification tank 250 via sensor 259, monitoring the water level via sensor 256, monitoring additive level via sensor 271, engine temperature, truck speed, ambient temperature, and fuel water separation ratio via sensor 257. In some examples, the electrical control system is utilized for programmable control of the valve control system 160. In some implementations, the electrical control system enables programmable control for the metering of water and/or additives to the emulsification input line 218. Implemented with the electrical control system, the operator interface cable 126 may enable the operator to view states of the FES 200 and provide manual and/or automatic functions of the FES 200. For instance, the electrical control system implementing the operator interface cable 126 may be utilized to control the emulsification device 210 (e.g., the reactor 230 and the pump 240), the water pump 222, the heating unit of the fuel tank 250, the slave pump 241, cooling provided by the fan of the radiator/fan module 260, and/or additive injection systems.

The electrical control system and the control module 205 may communicate with the operator via the operator interface device 1600 connected to the operator interface cable 126. In some examples, the operator interface device 1600 and the control module 205 are configured for wireless communication. Based on the various monitored parameters monitored by the control module, a graphical user interface (GUI) 1700 executing on the operator interface device 1600 may be prompted to display various display screens for the operator of the vehicle to view and initiate commands when applicable. The display screens may indicate current operating conditions of the FES 200 and/or the engine 102.

Figure 5:
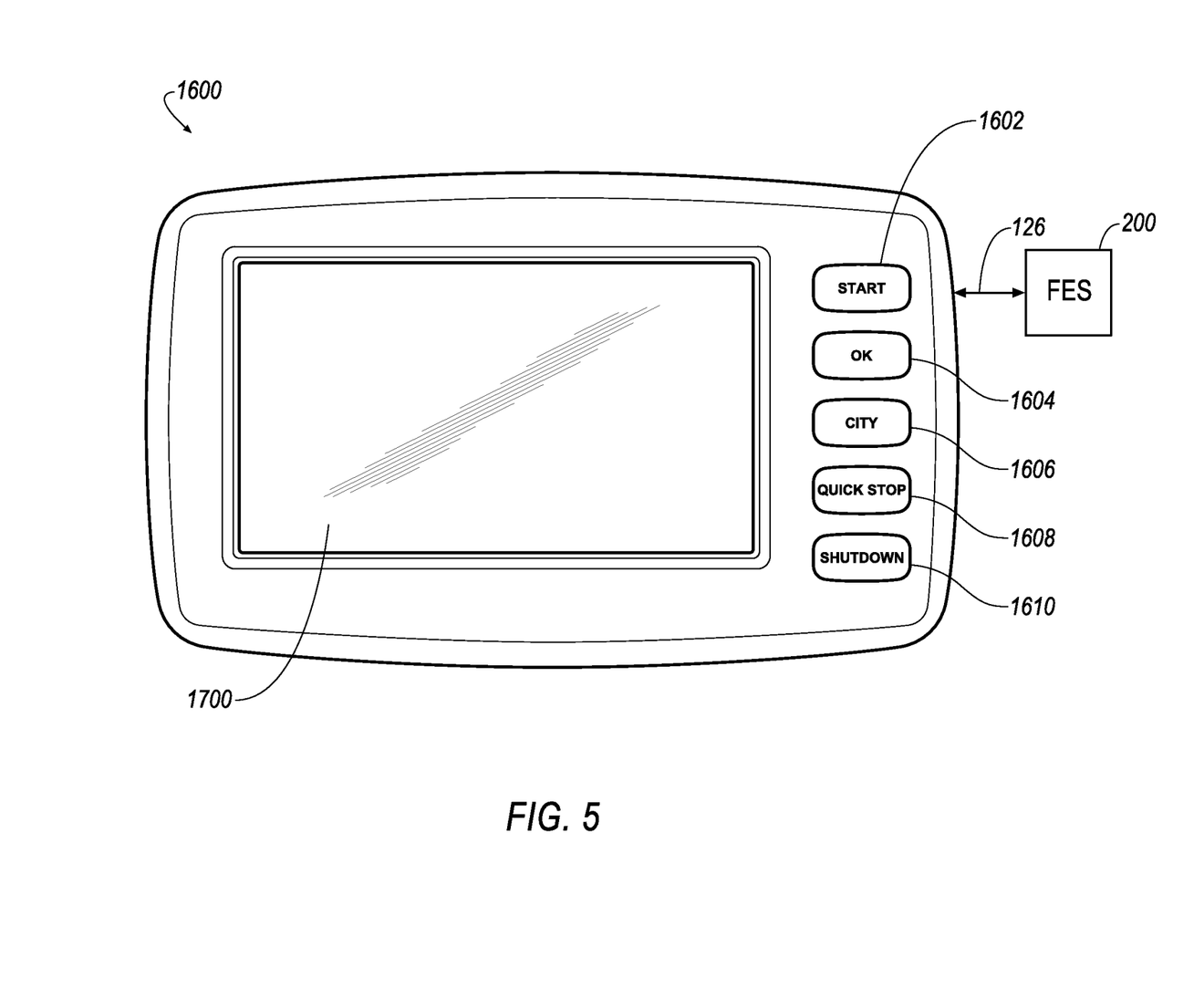
FIG. 5 is a schematic view of an example operator interface device executing a graphical user interface.

FIG. 5 shows an exemplary operator interface device 1600 executing the GUI 1700. The operator interface device 1600 may include an LCD screen and one or more input buttons, such as "Start" "Ok", "City", "Quick Stop", and "Shut Down" buttons 1602-1610, that the operator may select (e.g., by pressing). Additionally or alternatively, the GUI 1700 may be a touch screen that displays graphical elements (e.g., buttons) that may receive operator inputs via touching or an input device. Accordingly, the operator of the vehicle may refer to the display screens for operating the vehicle and practicing driving behaviors that result in increased fuel efficiency and reduced emissions.

In some examples, the GUI 1700 renders a fault screen indicating one or more faults detected within the FES 200. For instance, the control module 205 may detect pump failures during operation of the FES 200 if a pump current sensor either drops too low or too high resulting in the pump being flagged and requiring a technician to reset the fault. Additionally, the control module 205 may detect valve (e.g., flow control valves 1-8) failures during operation of the FES 200 if any of the valves are detected as having an open or short circuit. Failures in the electrical control system, such as the operator interface cable 112 not being able to communicate with the rest of the system, may also graphically display upon the GUI 1700.

In some examples, the GUI 1700 executing on the operator interface device 1600 renders warning screens indicating one or more issues with the FES 200. For instance, a warning indicating ambient temperature is too cold may be rendered upon the GUI 1700 when the temperature is below 35° F. to inform the operator that the water tank 120 should be drained (e.g., using auto drain 121). When temperatures are between 32° F. and 35° F., the GUI 1700 may render warnings subtly to inform the driver that water stored within the water tank 120 is at risk of freezing. Warnings may be rendered for low water levels within the water tank 120. A warning indicating an end of life of the pump 240 or the fan 260 may be rendered upon the GUI 1700. In some instances, a warning indicating a serial number is missing may be rendered upon the GUI 1700 when the FES 200 is not properly setup. The operator interface device 1600 may further enable the operator to configure settings based upon geographical locations. For instance, drain water tank warnings may not be insistent in geographical locations with cold climates during particular seasons.

Figure 6A:
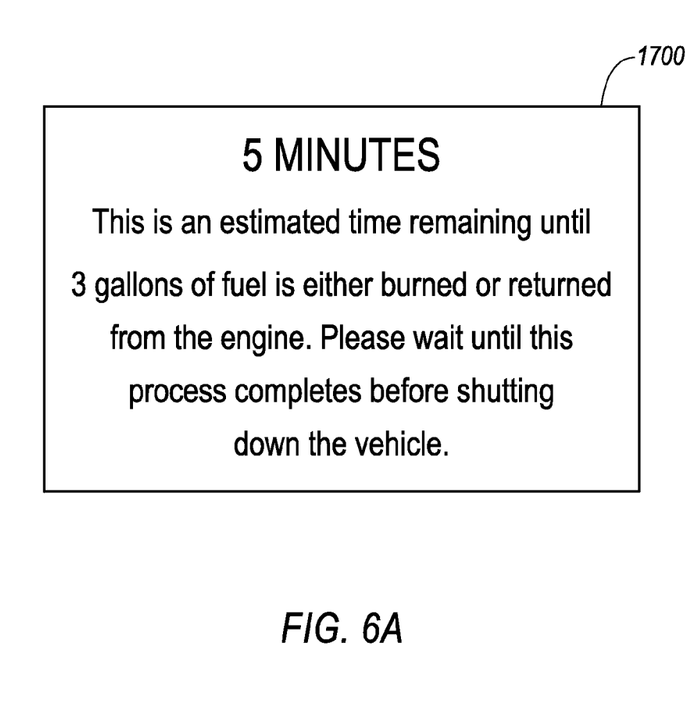
FIGS. 6A and 6B show example graphics displayed upon the graphical user interface executing on the operator interface device of FIG. 5.

In some implementations, the GUI 1700 executing on the operator interface device 1600 renders graphics informing the operator of a calculated time remaining for shutting down the FES 200 if the system was shut-down automatically (not manually by the driver). In other examples, if the driver desires to shut-down the vehicle, the GUI 1700 renders a graphic informing the operator of a calculated time remaining for shutting down the FES 200 if emulsified fuel is present. For instance, FIG. 6A shows the GUI 1700 displaying the following graphical message: "This is an estimated time remaining until 3 gallons of fuel is either burned or returned from the engine. Please wait until this process completes before shutting down the vehicle". The message may further inform the driver to increase the engine speed if the emulsified fuel is being collected slowly. Thus, the calculated time remaining for shutting down the FES 200 corresponds to the time for the evacuation mode to complete such that the FES 200 is purged of emulsified fuel by being burned and/or reclaimed for return back to the emulsification tank 250 via the suck back line 109 and/or the fuel return line 106.

The GUI 1700 may also display graphics that track driving behavior of the vehicle. Driving behavior may include system serial number, installation date, average miles per gallon (MPG) for the life of the FES 200, trip MPG, trip mileage, trip mileage on emulsified fuel and emulsifiers, trip mileage on emulsified fuel only, gallons of water used per trip and life remaining, pump status, poor driving characteristics during a trip. In some implementations, the operator may input commands to the operator interface device 1600 via the GUI 1700 to initiate one or more settings for the FES 200. For instance, fuel rail volume and a ratio of water to fuel in the emulsified fuel may be set by the operator.

In some implementations, the GUI 1700 executing on the operator interface device 1600 renders alarm graphics that indicate when the engine 102 is turned off without executing a proper shut-down. Warnings may be visual as well as audio. In some scenarios, the engine 102 can be shut down for short periods of time while the FES 200 is still operating, enabling the operator to turn off the engine for a quick stop. Here, when using the quick stop, the FES 200 requires at least a predetermined time period (e.g., 15 minutes) to elapse before the quick stop option is available again.

Figure 6B:
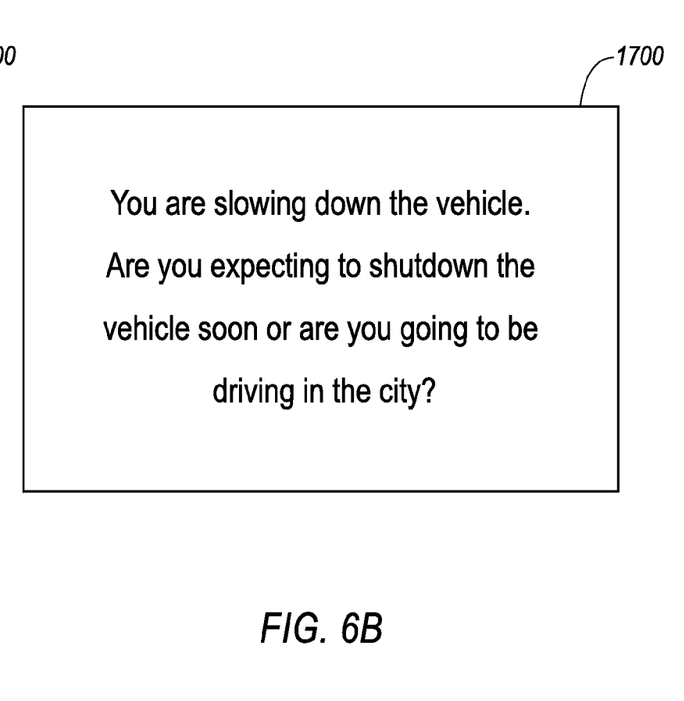

In some examples, when the control module 205 detects a vehicle speed decreasing below a predetermined vehicle speed, the control module 205 prompts the operator interface device 1600 to display an inquiry graphic upon the GUI 1700 that requests an input from the operator to indicate whether the operator intends to shut-down the vehicle in the near future or whether the operator intends to drive the vehicle in a city. For instance, FIG. 6B shows the GUI 1700 displaying the following inquiry graphic: "You are slowing down the vehicle. Are you expecting to shut-down the vehicle soon or are you going to be driving in the city?" Here, the operator can use the GUI 1700 to input a command to the operator interface device 1600 that states that the operator intends to shut-down the vehicle (e.g., by pressing the Shut-down button 1610 of FIG. 5) or intends to drive the vehicle in the city (e.g., by pressing the City button 1604 of FIG. 5). If the operator input indicates a vehicle shut-down, the control module 205 may execute the suck back mode to reclaim semi-stable emulsified fuel within the FES 200 and performs a power bleed to the engine 102 with virgin fuel by executing the bypass mode. If city driving is selected by the operator, the control module 205 may transition to the bypass mode and capture any unburned emulsified fuel for storage in the emulsification tank 250. For example, fueling the engine with virgin fuel in the bypass mode may be more suitable for city driving than fueling the engine with emulsified fuel.

A number of implementations have been described. Nevertheless, it will be understood that various modifications may be made without departing from the spirit and scope of the disclosure. Accordingly, other implementations are within the scope of the following claims.

What is claimed is:
1. A fuel emulsion system comprising:
an emulsification device configured to selectively receive a liquid mixture of water and hydrocarbon fuel and produce batches of emulsified fuel including water-micro droplets emulsified in the hydrocarbon fuel;
a processed fuel tank in fluid communication with the emulsification device and an engine, the processed fuel tank configured to selectively receive and store the emulsified fuel produced by the emulsification device;
a tank input line configured to provide downstream fluid communication from the emulsification device to the processed fuel tank;
an emulsification recirculation line configured to selectively provide fluid communication between the emulsification device and the processed fuel tank; and a control module configured to:
monitor one or more operating parameters;
execute one or more operating modes of the fuel emulsion system based on the monitored operating parameters, the operating modes comprising:
a bypass mode configured to provide the engine with the hydrocarbon fuel while restricting the emulsification device and the processed fuel tank from receiving the hydrocarbon fuel;
an emulsification production mode configured to provide the emulsification device with the hydrocarbon fuel and the water to produce the emulsified fuel and provide the emulsified fuel produced by the emulsification device to the processed fuel tank via the tank input line without passing through the engine, the processed fuel tank configured to store the emulsified fuel;
an emulsification recirculation mode configured to continually recirculate emulsified fuel through the emulsification device and the processed fuel tank via the emulsification recirculation line and the tank input line, the continually recirculated emulsified fuel bypassing the engine;
an emulsified fuel run mode configured to operate the engine with emulsified fuel produced by the emulsification device and stored within the processed fuel tank; and
a suck back mode configured to return semi-stable emulsified fuel within at least one of a fuel supply line or a fuel suck back line back to the processed fuel tank.

2. The system of claim 1, wherein the control module executes the bypass mode during at least one of engine start-ups or engine shut-downs.

3. The system of claim 1, wherein the control module executes the bypass mode and the emulsification production mode simultaneously.

4. The system of claim 1, wherein the emulsification production mode is configured to provide a portion of the hydrocarbon fuel to the processed fuel tank before providing the emulsification device with the hydrocarbon fuel and the water to produce the emulsified fuel.

5. The system of claim 4, wherein the emulsification production mode is further configured to provide the emulsification device with one or more additives from one or more additive tanks.

6. The system of claim 1, further comprising:
a fuel level sensor in communication with the control module and configured to measure an amount of emulsified fuel within the processed fuel tank; and
wherein the control module executes the emulsification production mode in response to the fuel level sensor indicating that the measured amount of emulsified fuel within the processed fuel tank is below a predetermined fuel level.

7. The system of claim 6, wherein the control module executes the emulsification production mode and the emulsification run mode simultaneously.

8. The system of claim 1, further comprising:
a water-in-fuel sensor at the processed fuel tank in communication with the control module and configured to measure a water-in-fuel separation ratio of the emulsified fuel settling while stored within the processed fuel tank; and
wherein the control module executes the emulsification recirculation mode in response to the water-in-fuel sensor indicating that the measured water-in-fuel separation ratio reaches a predetermined separation level.

9. The system of claim 1, wherein the control module executes the emulsification recirculation mode when the emulsified fuel stored within the processed fuel tank has settled for a predetermined elapsed period of time.

10. The system of claim 1, wherein the control module executes the emulsified fuel run mode when at least one of an engine load or engine speed is within a predetermined range suitable for fueling the engine with the emulsified fuel.

11. The system of claim 1, wherein the control module executes the suck back mode during periodic intervals.

12. The system of claim 1, further comprising a plurality of flow control devices in communication with the control module and operative between open and closed positions to control fluid flow based upon the one or more operating modes currently executing.

13. The system of claim 1, further comprising a radiator/fan module in fluid communication with the processed fuel tank and configured to cool the emulsified fuel stored within the processed fuel tank by circulating the emulsified fuel therethrough.

14. The system of claim 1, further comprising an operator interface device in communication with the control module, the operator interface device executing a graphical user interface configured to display graphics indicating current operating conditions of the fuel emulsion system.

15. A fuel emulsion system for fueling an engine of a vehicle, the system comprising:
an emulsification device configured to selectively receive a liquid mixture of water and hydrocarbon fuel and produce batches of emulsified fuel including water-micro droplets emulsified in the hydrocarbon fuel;
a processed fuel tank in fluid communication with the emulsification device and the engine, the processed fuel tank configured to selectively receive and store the emulsified fuel produced by the emulsification device;
a tank input line configured to provide downstream fluid communication from the emulsification device to the processed fuel tank;
an operator interface device executing a graphical user interface configured to display graphics indicating current operating conditions of the fuel emulsion system; and
a control module in communication with the operator interface device and configured to:
monitor one or more operating parameters;
execute one or more operating modes of the fuel emulsion system based on the monitored operating parameters, the operating modes comprising:
a bypass mode configured provide the engine with the hydrocarbon fuel while restricting the emulsification device and the processed fuel tank from receiving the hydrocarbon fuel;
an emulsification production mode configured to provide the emulsification device with the hydrocarbon fuel and the water to produce the emulsified fuel and provide the emulsified fuel produced by the emulsification device to the processed fuel tank via the tank input line without passing through the engine, the processed fuel tank configured to store the emulsified fuel;
an emulsified fuel run mode configured to operate the engine with emulsified fuel produced by the emulsification device and stored within the processed fuel tank, the processed fuel tank providing the emulsified fuel to the engine via a fuel input line without passing the emulsified fuel back through the emulsification device; and a shut-down mode configured to at least one of burn off or reclaim semi-stable emulsified fuel within the fuel emulsion system.

16. The system of claim 15, wherein:

the control module prompts the operator interface device to display an inquiry graphic upon the graphical user interface in response to a speed of the vehicle decreasing below a predetermined vehicle speed, the inquiry graphic requesting an input from the operator that indicates whether the operator intends to shut-down the vehicle or whether the operator intends to drive the vehicle in a city; and the control module executes the shut-down mode when the input from the operator indicates that the operator intends to shut-down the vehicle, or executes the bypass mode when the input from the operator indicates that the operator intends to drive the vehicle in the city.

17. The system of claim 15, further comprising an additive input line configured to selectively provide at least one of additives, lubricants, or emulsifier agents to the emulsification device to produce the emulsified fuel.

18. The system of claim 15, wherein the emulsification device comprises a static mixer, a reactor, and a pump.

19. The system of claim 15, further comprising:

a tank input line configured to provide downstream fluid communication from the emulsification device to the processed fuel tank;

an emulsification recirculation line configured to selectively provide fluid communication between the emulsification device and the processed fuel tank; and wherein the control module executes an emulsification recirculation mode configured to continually recirculate emulsified fuel through the emulsification device and the processed fuel tank via the emulsification recirculation line and the tank input line, the continually recirculated emulsified fuel bypassing the engine.

20. The system of claim 15, further comprising:

a radiator/fan module;

a cooling circuit providing fluid communication between the processed fuel tank and the radiator/fan module; and a pump configured to circulate emulsified fuel stored within the processed fuel tank through the cooling circuit and the radiator/fan module to cool the emulsified fuel.

* * * * *